United States Patent
Allred

(10) Patent No.: US 9,633,164 B2
(45) Date of Patent: Apr. 25, 2017

(54) SYSTEM AND METHOD FOR SIGNAL INTEGRITY WAVEFORM DECOMPOSITION ANALYSIS

(71) Applicant: Signal Integrity Software, Inc., Maynard, MA (US)

(72) Inventor: Richard Joseph Allred, Centerville, UT (US)

(73) Assignee: SIGNAL INTEGRITY SOFTWARE, INC., Maynard, MA (US)

(*) Notice: Subject to any disclaimer, the term of this patent is extended or adjusted under 35 U.S.C. 154(b) by 259 days.

(21) Appl. No.: 14/511,632

(22) Filed: Oct. 10, 2014

(65) Prior Publication Data

US 2016/0103944 A1 Apr. 14, 2016

(51) Int. Cl.
| G06F 17/50 | (2006.01) |
| G01R 13/00 | (2006.01) |
| G01R 13/02 | (2006.01) |

(52) U.S. Cl.
CPC ....... G06F 17/5081 (2013.01); G01R 13/029 (2013.01); G06F 17/5009 (2013.01); G06F 17/5072 (2013.01); *G01R 13/00* (2013.01)

(58) Field of Classification Search
None
See application file for complete search history.

(56) References Cited

U.S. PATENT DOCUMENTS

| 5,321,365 A * | 6/1994 | Diamond | G01R 31/11 324/533 |
| 6,137,293 A | 10/2000 | Wu et al. | |
| 6,915,249 B1 * | 7/2005 | Sato | G06F 17/5036 370/201 |
| 7,143,023 B2 | 11/2006 | Katz et al. | |
| 7,250,772 B2 * | 7/2007 | Furse | G01R 31/11 324/533 |
| 7,292,621 B2 | 11/2007 | Braam et al. | |
| 7,310,595 B2 * | 12/2007 | Lowther | G06F 17/5036 257/516 |
| 7,346,480 B1 * | 3/2008 | Pekarek | G06F 17/5036 326/30 |
| 7,483,477 B2 * | 1/2009 | Nygaard, Jr. | G01R 1/025 375/220 |
| 7,702,502 B2 * | 4/2010 | Ricci | G06K 9/00523 600/509 |
| 8,386,216 B1 * | 2/2013 | Al-Hawari | G06F 17/5036 703/2 |
| 9,286,177 B1 * | 3/2016 | Pritchard | H04L 29/00 |
| 2003/0182640 A1 * | 9/2003 | Alani | G06F 17/5036 716/115 |

(Continued)

OTHER PUBLICATIONS

B.K. Casper et al., "An Accurate and Efficient Analysis Method for Multi-Gb/s Chip-to-chip Signaling Schemes," 2002 Symposium on VLSI Circuits Digest of Technical Papers, IEEE, pp. 54-57.*

*Primary Examiner* — Leigh Garbowski
(74) *Attorney, Agent, or Firm* — Schmeiser, Olsen & Watts LLP

(57) ABSTRACT

A system and method of analyzing signal performance of a hardware system includes dividing a simulation of the hardware system into a chain of blocks, identifying resonant loops between pairs of blocks in the chain of blocks, determining a loop response for each of the identified resonant loops, and determining an impact of each loop response on a performance of the system.

27 Claims, 13 Drawing Sheets

(56) References Cited

U.S. PATENT DOCUMENTS

| | | | | |
|---|---|---|---|---|
| 2003/0188267 A1* | 10/2003 | Lehner | ............... | G06F 17/5036 |
| | | | | 716/113 |
| 2006/0200034 A1 | 9/2006 | Ricci et al. | | |
| 2014/0016686 A1* | 1/2014 | Ben Artsi | ............... | H01L 23/66 |
| | | | | 375/230 |
| 2014/0343883 A1* | 11/2014 | Libby | ................... | G01R 13/02 |
| | | | | 702/68 |

* cited by examiner

SYSTEM AND METHOD FOR SIGNAL INTEGRITY WAVEFORM DECOMPOSITION ANALYSIS

FIELD OF THE INVENTION

The invention relates generally to systems and computer-implemented methods of signal integrity waveform analysis used to design and optimize printed circuit boards, electrical packages, and connectors of computer and electronic equipment.

BACKGROUND

Impedance discontinuities in the hardware interconnect (e.g., printed circuit boards, electrical packaging, connectors) used in computers and other electronic equipment can significantly degrade system performance. These impedance discontinuities interact with the propagation of signals in non-intuitive ways, making it difficult to understand the root cause of the performance degradation. A traditional approach to finding the cause of the performance degradation is to guess-and-check, a debugging technique requiring years of debugging experience and significant investment of time and resources.

SUMMARY

All examples and features mentioned below can be combined in any technically possible way.

In one aspect, a method of analyzing signal performance of a hardware system comprises dividing a simulation of the hardware system into a chain of blocks, identifying resonant loops between pairs of blocks in the chain of blocks, determining a loop response for each of the identified resonant loops, and determining an impact of each loop response on a performance of the system. The impact of each loop response on the system performance may correlate to an amount of closure of an eye diagram caused by that loop response.

Embodiments of the method may include one of the following features, or any combination thereof.

The method may further comprise generating an analytical expression for a total system response of the hardware system, and extracting the loop response for each resonant loop from the analytical expression.

An insertion loss deviation (ILD) value may be computed, in a frequency domain, for each block, for each resonant loop, and for a total system response.

The loop responses may be summed with a total reflection-less pulse response, and an error response calculated to quantify accuracy of the determined loop responses by comparing a totalsystem response with the sum of the loop responses and total reflection-less pulse response.

Reflection in the hardware system may be analyzed by decomposing a total system time-domain reflectometry (TDR) waveform into a plurality of energy paths and resonant loop responses. A loop diagram may be graphically displayed juxtapositioned with the TDR waveform. The loop diagram includes a diagram of each resonant loop together with an associated quantity representing an impact of that resonant loop on the system performance.

Sources of degradation on the system performance may be identified and ranked in response to determining the impact of each loop response on the system performance.

Areas may be highlighted with color in a display of a design layout corresponding to the hardware system. Each different highlighting color is associated with a different degree of degradation of the system performance caused by hardware in that highlighted area.

In another aspect, a computer program product for analyzing signal performance of a hardware system comprises a computer readable persistent storage medium having computer readable program code embodied therewith. The computer readable program code comprises computer readable program code configured to divide, if executed, a simulation of the hardware system into a chain of blocks, computer readable program code configured to identify, if executed, resonant loops between pairs of blocks in the chain of blocks, computer readable program code configured to determine, if executed, a loop response for each of the identified resonant loops, and computer readable program code configured to determine, if executed, an impact of each loop response on a performance of the system. The impact of each loop response on the system performance may correlate to an amount of closure of an eye diagram caused by that loop response.

Embodiments of the computer program product may include one of the following features, or any combination thereof.

The computer program product may further comprise computer readable program code configured to generate, if executed, an analytical expression for a total system response of the hardware system, and computer readable program code configured to extract, if executed, the loop response for each resonant loop from the analytical expression.

The computer program product may further comprise computer readable program code configured to compute, if executed, an insertion loss deviation (ILD) value, in a frequency domain, for each block, for each resonant loop, and for a total system response.

The computer program product may further comprise computer readable program code configured to sum, if executed, the loop responses with a total reflection-less pulse response, and computer readable program code configured to calculate, if executed, an error response to quantify accuracy of the determined loop responses by comparing a total system response with the sum of the loop responses with the total reflection-less pulse response.

The computer program product may further comprise computer readable program code configured to analyze, if executed, reflection in the hardware system by decomposing a total system time-domain reflectometry (TDR) waveform into a plurality of energy paths and resonant loop responses. The computer program product may further comprise computer readable program code configured to graphically display, if executed, a loop diagram juxtapositioned with the TDR waveform, the loop diagram including a diagram of each resonant loop together with an associated quantity representing an impact of that resonant loop on the system performance.

The computer program product may further comprise computer readable program code configured to identify and rank, if executed, sources of degradation on the system performance in response to determining the impact of each loop response on the system performance, The computer program product may further comprise computer readable program code configured to highlight with color, if executed, areas in a display of a design layout corresponding to the hardware system. Each different highlighting color is associated with a different degree of degradation of the system performance caused by hardware in a highlighted area.

In another aspect, a system for analyzing signal performance of a hardware system comprises memory storing a waveform analysis simulation program, and a processor executing the waveform analysis simulation program to divide a simulation of the hardware system into a chain of blocks, to identify resonant loops between pairs of blocks in the chain of blocks, to determine a loop response for each of the identified resonant loops, and determine an impact of each loop response on a performance of the hardware system. The impact of each loop response on the system performance may correlate to an amount of closure of an eye diagram caused by that loop response.

Embodiments of the system may include one of the following features, or any combination thereof.

The processor of the system may further execute the waveform analysis simulation program to generate an analytical expression for a total system response of the hardware system, and extract the loop response for each resonant loop from the analytical expression.

The processor may further execute the waveform analysis simulation program to compute an insertion loss deviation (ILD) value, in a frequency domain, for each block, for each resonant loop, and for a total system response.

The processor may further execute the waveform analysis simulation program to sum the loop responses with a total reflection-less pulse response and calculate an error response to quantify accuracy of the determined loop responses by comparing a total system response with the sum of the loop responsesand the total refleciton-less pulse response.

The processor may further execute the waveform analysis simulation program to analyze reflection in the hardware system by decomposing a total system time-domain reflectometry (TDR) waveform into a plurality of energy paths and resonant loop responses, or to graphically display a loop diagram juxtapositioned with the TDR waveform. The loop diagram includes a diagram of each resonant loop together with an associated quantity representing an impact of that resonant loop on the system performance.

The processor may further execute the waveform analysis simulation program to identify and rank sources of degradation on the system performance in response to determining the impact of each loop response on the system performance, or to highlight, with color, areas in a display of a design layout corresponding to the hardware system, wherein each different highlighting color is associated with a different degree of degradation of the system performance caused by hardware in that highlighted area.

BRIEF DESCRIPTION OF THE DRAWINGS

The above and further features and advantages may be better understood by referring to the following description in conjunction with the accompanying drawings, in which like numerals indicate like structural elements and features in various figures. The drawings are not necessarily to scale, emphasis instead being placed upon illustrating the principles of features and implementations.

DETAILED DESCRIPTION

Systems and methods described herein relate to an automated process in a system simulation for finding impedance discontinuities in hardware interconnect that may degrade system performance. The automated process systematically identifies each pair of discontinuities (which form a resonant loop), analyzes waveforms corresponding to the resonant loops, and, based on these waveforms, quantifies the impact of each resonant loop on the final system performance. The impact on system performance may be based on a simulated eye pattern or diagram of a data signal repeatedly sampled at a receiver in the system, similar to what is commonly done with an oscilloscope on a physical circuit. Closure or near-closure of the eye pattern corresponds to poor system performance, whereas an open eye pattern corresponds to good system performance; the greater the height opening of the eye pattern, the cleaner the data signal and, thus, the better the system performance. With specific information about how each feature of the interconnect design impacts system performance, system optimization may be performed in a routine, repeatable way.

Figure 1:
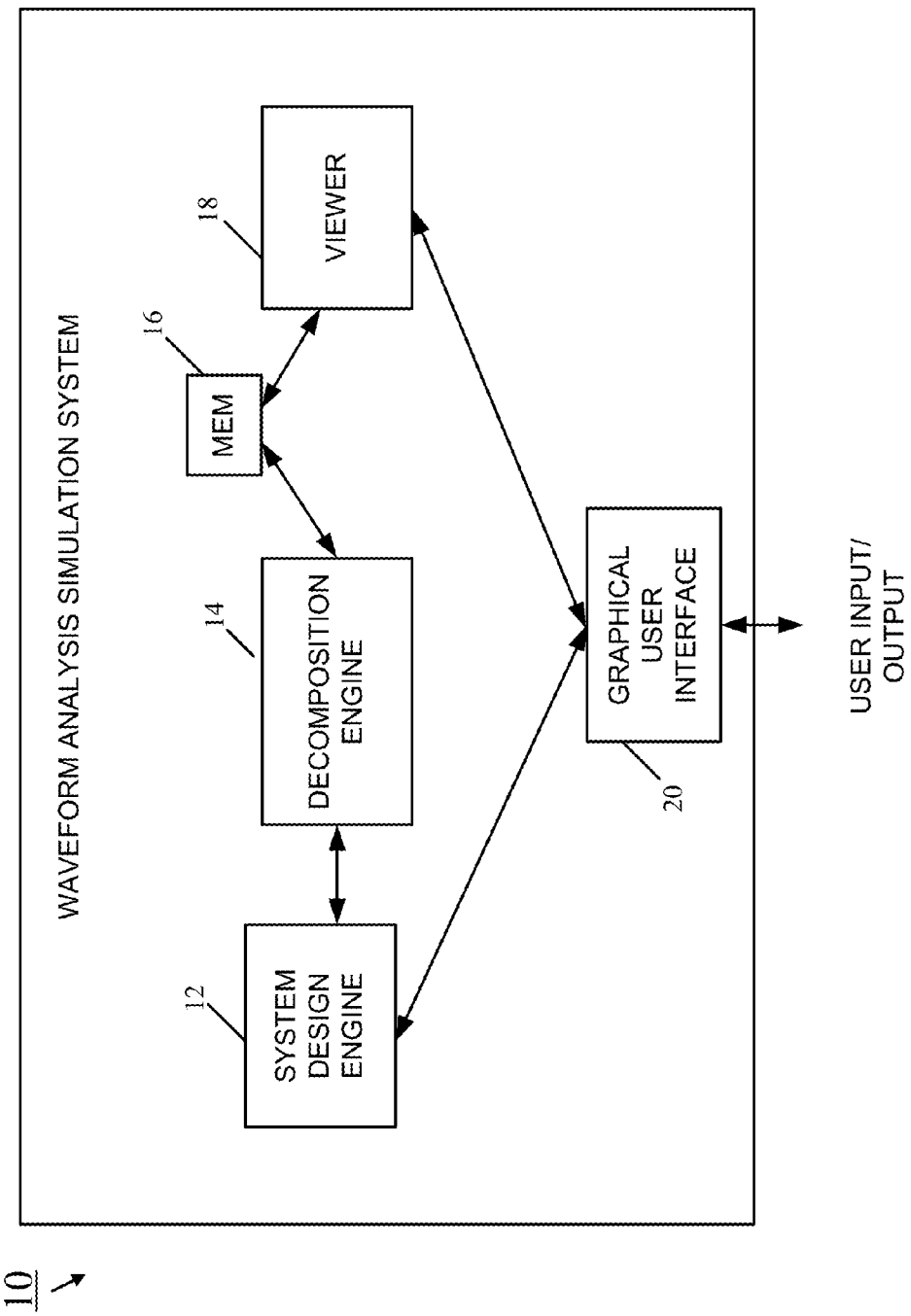
FIG. 1 is a block diagram representation of an embodiment of a waveform analysis simulation system.

FIG. 1 is a block diagram representation of an embodiment of a waveform analysis simulation system 10, including a system design engine 12, a decomposition engine 14, memory 16, a viewer 18, and a graphical user interface 20. The system design engine 12 includes program code configured to analyze the physical design of a circuit, partition the circuit into a series or chain of blocks of electrical components, and produce net lists and scattering parameters (s-parameters) associated with the blocks. In general, a net list includes key information about the components of the circuit, for example, component connectivity, component transfers, operating frequency, and points of measurement. The system design engine 12 can determine the total system response of the circuit.

The decomposition engine 14 is in communication with the system design engine 12 to receive the net lists and s-parameters associated with the blocks. The decomposition engine 14 includes program code configured to decompose the total system response into a set of constituent waveforms, as described in more detail below.

The memory 16 stores various files, including results produced by the decomposition engine 14. The viewer 18 includes program code configured to recognize results files produced by the decomposition engine 14 and to provide options to the user of the system 10 for graphically viewing waveforms and diagrams based on the information recorded in the results files. Through the graphical user interface 20, the user can submit instructions or commands to the system design engine 12 and interact with the viewer 18 to produce views of the waveform analysis results, also referred to herein as decomposition results.

Figure 2:
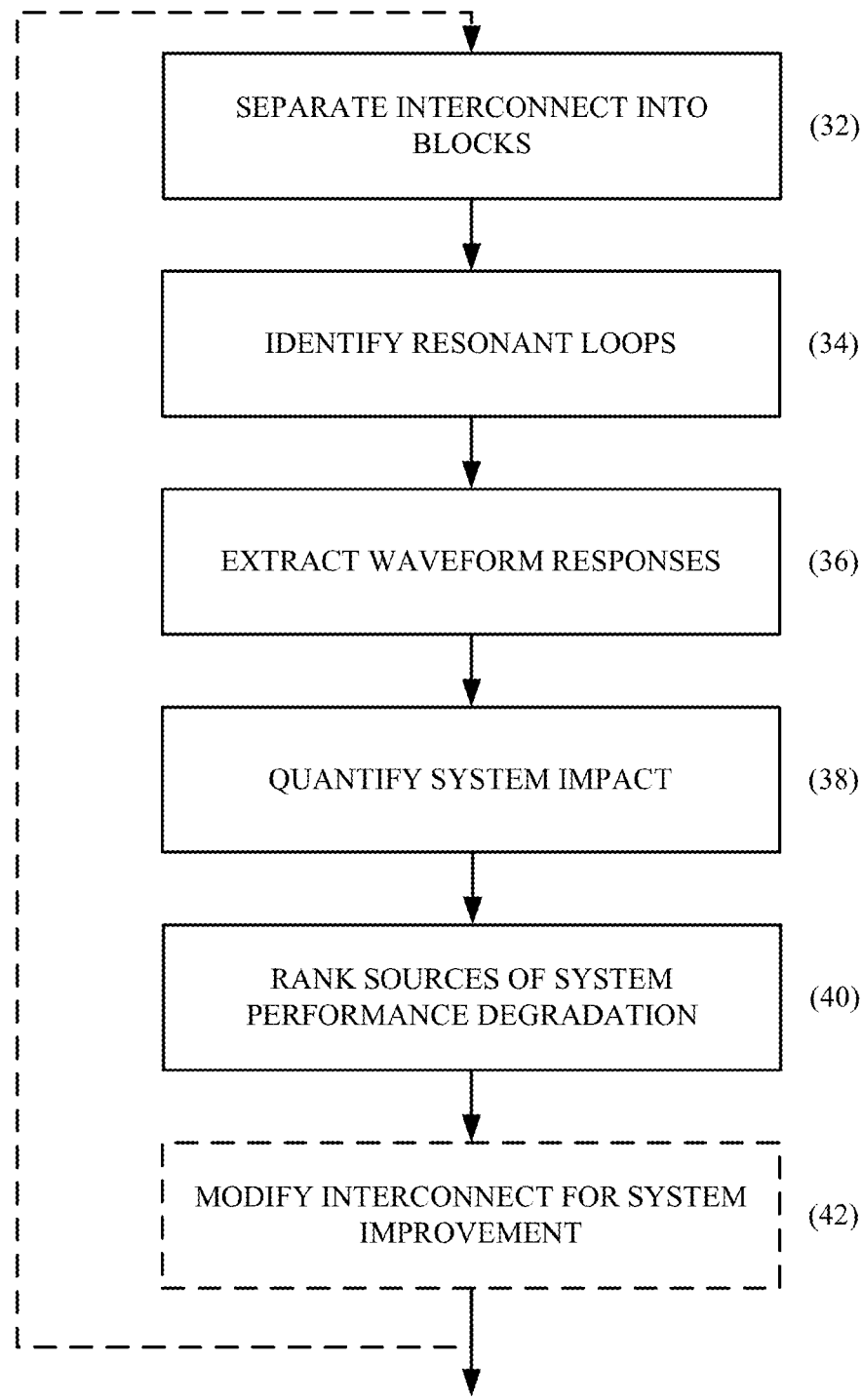
FIG. 2 is a flow diagram of an embodiment of a general process for optimizing the performance of a system using the waveform analysis simulation system of FIG. 1.

FIG. 2 shows an embodiment of a general process 30 for optimizing the performance of a system using the waveform analysis simulation system 10 of FIG. 1. In brief overview, the waveform analysis simulation system 10 divides (step 32) the various interconnect hardware of the system into blocks, identifies (step 34) resonant loops between pairs of blocks, and extracts (step 36) waveform responses for each of the resonant loops. In addition, the waveform analysis simulation system 10 quantifies (step 38) the impact of each component waveform response on the total response of the system and ranks (step 40) the sources of degradation based on the degree of impact on the final system performance. Optionally (signified in phantom), the interconnect hardware may be modified (step 42) based on the reported sources of degradation in order to improve system performance, such as by making one or more of the reported sources to be more transparent (produce less of an impedance discontinuity).

Figure 3:
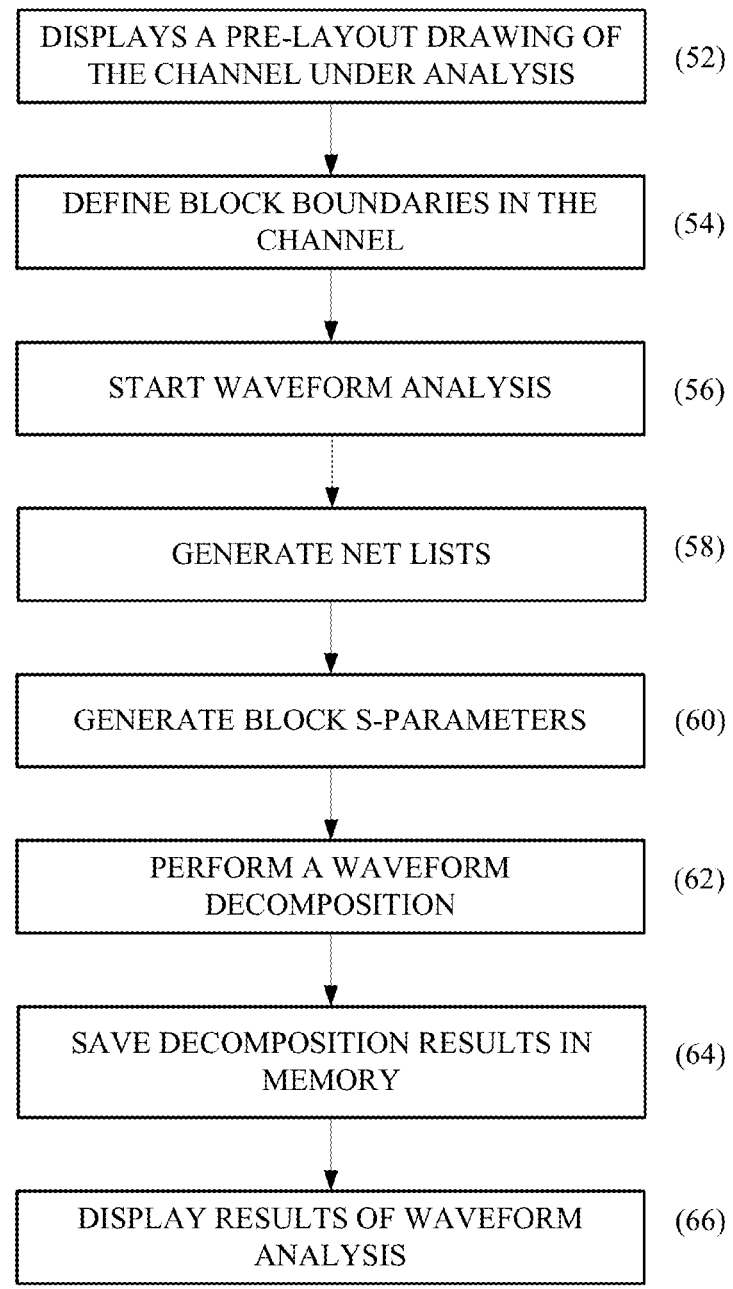
FIG. 3 is a flow diagram of an embodiment of a process for performing a waveform analysis of a system.

FIG. 3 shows an embodiment of a process 50 for performing a waveform analysis of a system with reference to the elements shown in FIG. 1. The graphical user interface 20 of the simulation system 10 displays (step 52) a pre-layout drawing of the system (e.g., circuit, channel, link) being analyzed. Interacting with the pre-layout drawing through the graphical user interface 20, the user places (step 54) special probes on a pre-layout drawing to manually define block boundaries. In another embodiment, the system design engine 12 can automatically determine the block boundaries, with or without user-supplied guidance.

After placing the probes, the user starts (step 56) the waveform analysis. The system design engine 12 receives and recognizes the probes and generates (step 58) netlists used to extract block s-parameters. In addition, the system design engine 12 generates (step 60) block s-parameters from the block netlists and passes the block netlists and block s-parameters to the decomposition engine 14. The decomposition engine 14 processes the blocks, using the net lists and s-parameters, to perform (step 62) a waveform decomposition, and writes (step 64) files containing the decomposition results to a simulation results directory maintained in the memory 16. In response to user-supplied instructions, the viewer 18 accesses the simulation results directory to acquire a decomposition results file and displays (step 66) the results of the waveform analysis in any of the various report formats described below. Such reporting formats are not exhaustive, but merely illustrative of the types of information that can be obtained from the decomposition results.

Figure 4:
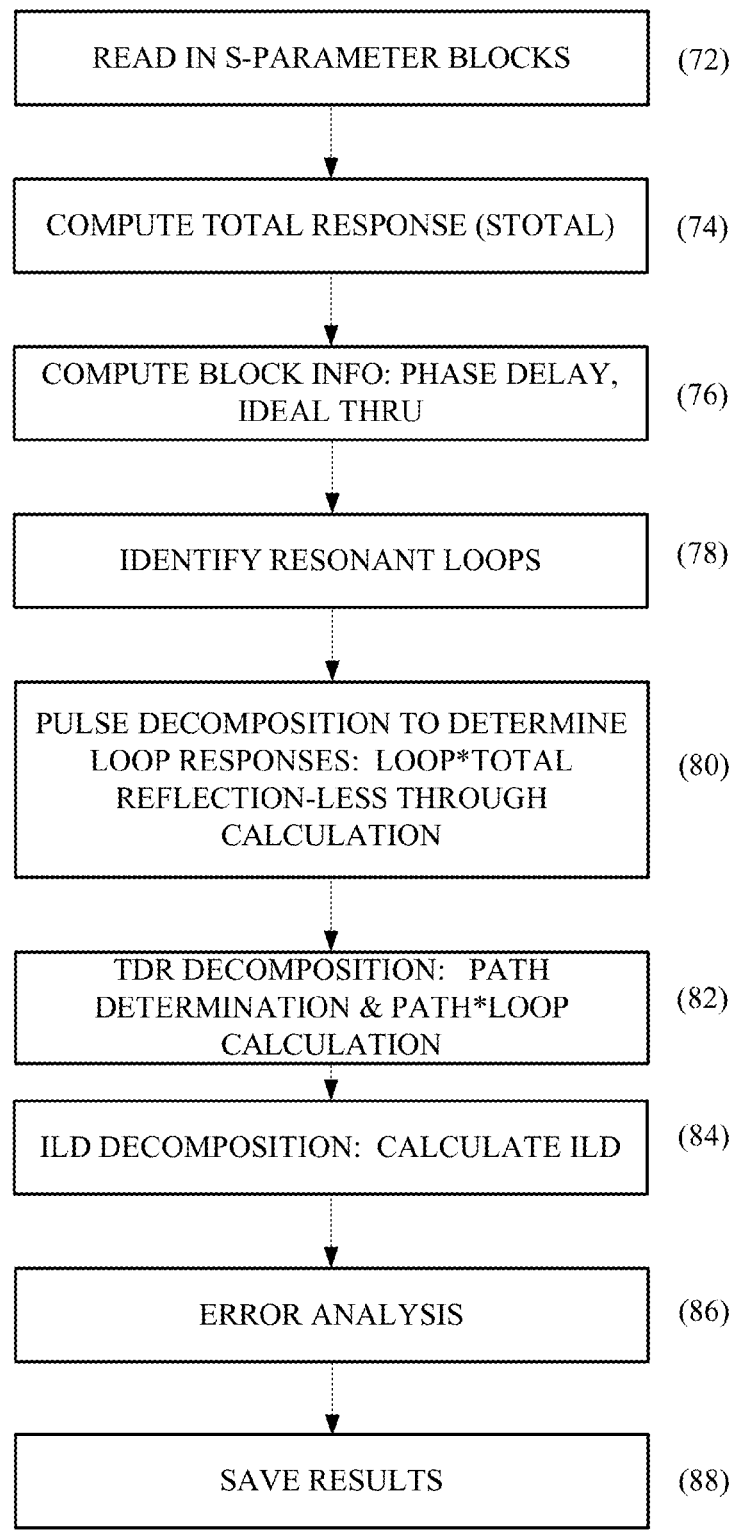
FIG. 4 is a flow diagram of an embodiment of a process used to decompose a total system response into constituent loop responses.

FIG. 4 shows an embodiment of a process 70 for decomposing a total system response into constituent responses. The decomposition engine 14 acquires (step 72) s-parameter blocks from the system design engine 12 (or from memory 16, or a combination thereof). The decomposition engine 14 (or system design engine 12) computes (step 74) a total system response. In general, the total system response is the end-to-end response or combination of all s-parameter blocks determined from the system. Determining the total system response requires the information from all of the blocks, and corresponds to the total transfer function of the whole system (i.e., interconnect, channel, link). The total system response serves in the comparison of the sum of decomposed blocks to calculate a decomposition error, as described in more detail below in connection with FIG. 6.

From the information acquired from the system design engine 12, the decomposition engine computes (step 76) block information, such as phase delay through each block and a reflection-less throughput of each block. The decomposition engine 14 analyzes the blocks to identify (step 78) resonant loops between pairs of blocks.

In the decomposition of the total system response, the decomposition engine 14 may decompose three types of waveforms: a pulse response; a time-domain reflectometry (TDR) response; and an insertion loss deviation (ILD) response. The decomposition of these three types of waveforms can occur in any order or in parallel. The order presented in the description of this process 70 is just one example. Some embodiments of the decomposition engine 14 decompose a pulse response only (i.e., no TDR or ILD response decompositions are performed).

At step 80, the decomposition engine 14 performs pulse decomposition in the time domain to determine loop response waveforms corresponding to these resonant loops. Pulse decomposition enables direct quantification of the impact of each given resonant loop on the total system performance measured, for example, as eye pattern height. The quantification facilitates prioritization of efforts to improve the system performance. To obtain a decomposed pulse response waveform, each loop response may be represented as a finite sum. Each finite sum (i.e., a loop response) is multiplied by the total reflection-less through response (i.e., a combination of the reflection-less through responses for all of the blocks) to produce the corresponding loop response waveform, as illustrated below in connection with FIG. 6C.

The pulse response decomposition is accomplished by finding an analytical expression, in terms of the identified blocks, for the total system response using the classic Mason's Rule technique. That the analytical expression is in terms of blocks ties the analytical expression (and related decomposition) to the physical components represented by the blocks. This analytical expression is, in general, too complex to be readily factorized, but if Mason's Rule is not strictly followed in regards to the loop interactions, a physically meaningful approximate factorization can be found. With the total system response and each loop response as separate terms in the factorization, the impact of each term on the channel performance can be quantified.

Figure 5:
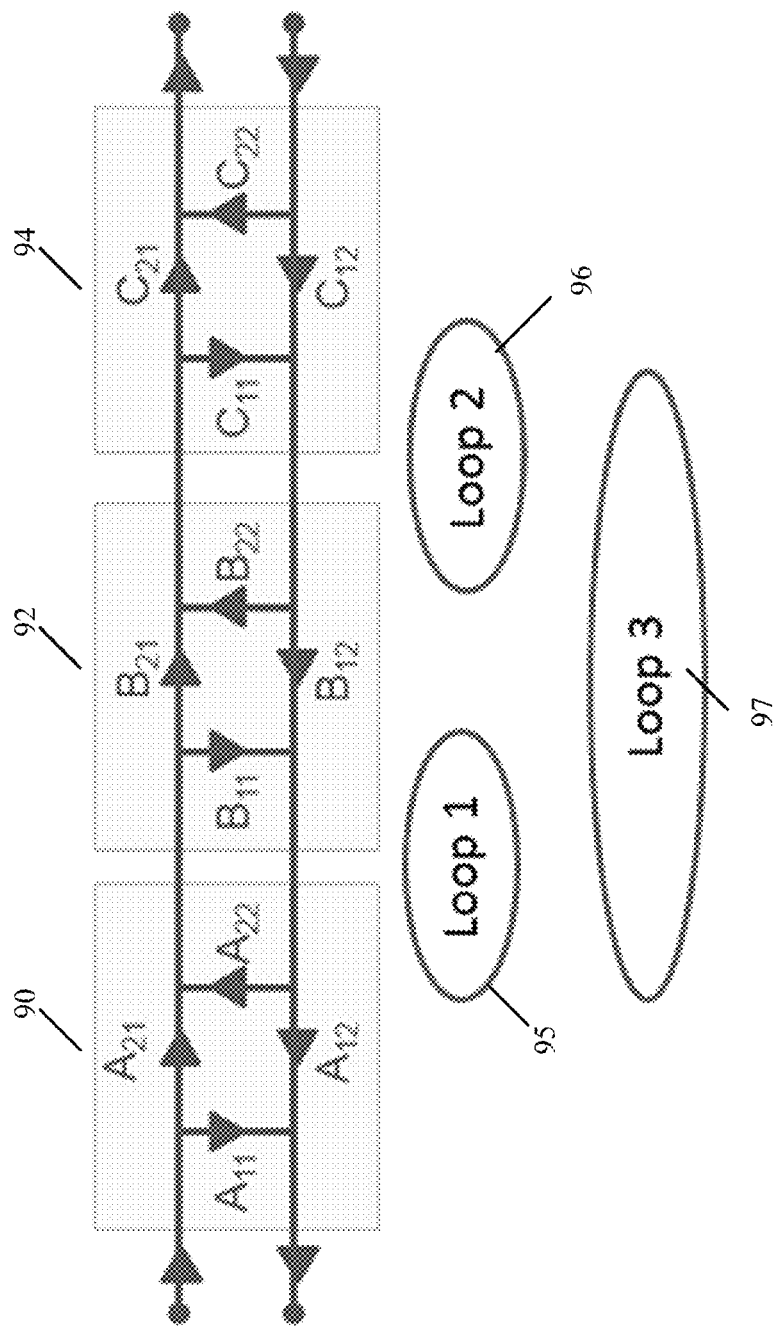
FIG. 5 is an example signal flow graph for three two-port s-parameter blocks.

For example, FIG. 5 shows a signal flow graph for three two-port s-parameter blocks 90, 92, and 94. Each block 90, 92, 94 has a set of reflection coefficients; for example, block 90 has reflection coefficients $A_{11}$, $A_{12}$, $A_{21}$, and $A_{22}$. Three resonant loops 95, 96, 97 are identified among the blocks: resonant loop 95 is between blocks 90 and 92; resonant loop 96 is between blocks 92 and 94; and resonant loop 97 is between blocks 90 and 94. The Mason's Rule expression for the total system response ($S_{21}$) is:

$$S_{21} = \frac{A_{21}B_{21}C_{21}}{1 - A_{22}B_{11} - B_{22}C_{11} - A_{22}B_{21}C_{11}B_{12} + A_{22}B_{11}B_{22}C_{11}} \quad \text{(Equation 1)}$$

The numerator of the expression (equation 1) is referred to as the total reflection-less through response, described previously. The denominator embodies the resonant loops of the system and is the primary source of performance degradation. The expression shows how characteristics (e.g., $B_{11}$ and $B_{22}$ are the reflection coefficients of the block 92) of each block impact the total through response ($S_{21}$). The expression above is physically meaningful because each term (e.g., $A_{22}$) can be traced to a block (which is physically meaningful by being traceable to a physical component or interconnect). Although, in this simple example, the denominator is not easily factored into terms that would facilitate a one-to-one correspondence between a block characteristic and the total through response, an approximation of the denominator may facilitate such factorization. For example, the approximation may be to ignore some second order effects in equation 1, to simplify the expression as follows:

$$S_{21} \approx \frac{A_{21}B_{21}C_{21}}{(1 - A_{22}B_{11})(1 - B_{22}C_{11})(1 - A_{22}B_{21}C_{11}B_{12})} \quad \text{(Equation 2)}$$

After such factorization, the $S_{21}$ is a product of the total reflection-less through response and the inverse of each loop response. A log of the factorized expression separates the terms into a sum, with each term of this sum being used to quantify the impact of the term on the total reflection-less through response. This approximation is sufficient for the frequency domain analysis.

To quantify the impact of each loop response on the total reflection-less through response entails a conversion of equation 2 into time domain results. To accomplish this conversion, a geometric power series expansion, such as shown in Equation 3, can be used to express the loop responses (i.e., the denominator terms of Equation 2):

$$\frac{1}{1-r} = 1 + r + r^2 + \ldots + r^\infty, \text{ if } r < 1 \quad \text{(Equation 3)}$$

Applying the expansion to the terms of the present example produces:

$$S_{21} \approx A_{21}B_{21}C_{21}(\Sigma_{i=0}^\infty (A_{22}B_{11})^i)(\Sigma_{i=0}^\infty (B_{22}C_{11})^i)(\Sigma_{i=0}^\infty (A_{22}B_{21}C_{11}B_{12})^i) \quad \text{(Equation 4)}$$

To obtain time domain waveforms from Equation 4 may entail truncating the infinite summation. The more terms remaining in the truncated summation, the more accurate is the decomposition. The resulting truncated summation provides an understanding of the contribution of each loop response to the total response (which corresponds to the contribution of each block to the overall response). An additional approximation can be to ignore any terms in the truncated summation that contain elements of multiple loops.

Returning to FIG. 4, the decomposition engine 14 optionally performs (step 82) TDR decomposition, separating a total system TDR waveform into energy paths and resonant loops. This separation enables the attribution of an impedance variation to a certain path or to a certain resonant loop. The simulated TDR results can be used in measurement correlation activities, where simulation attempts to replicate each impedance variation in a response measured directly on the actual hardware.

Energy paths are pathways by which energy can flow through the system. In FIG. 5, for example, the different paths by which energy can enter the system through a left port and exit the system through a left port are: $A_{11}$; $A_{21}$ to $B_{11}$ to $A_{12}$; and $A_{21}$ to $B_{21}$ to $C_{11}$ to $B_{12}$ to $A_{12}$. After the TDR energy paths are known and compared with the total true TDR response, impedance discontinuities in the total true TDR response become apparent. To obtain a decomposed TDR path response waveform, each energy is path is multiplied by the loops it touches. Each decomposed TDR path response can be further separated into reflection-less throughput and loop responses.

Returning again to FIG. 4, at step 84, the decomposition engine 14 optionally performs ILD decomposition in the frequency domain, which analyzes the system through response using an ILD metric. The ILD metric enables ranking of the contribution of the response of each block to the total ILD response.

To quantify the accuracy of the pulse decomposition, the decomposition engine 14 can calculate (step 86) an analysis error by comparing a sum of the loop response waveforms with a true total pulse response waveform.

The decomposition engine 14 saves (step 88) the results of the decompositions (pulse, TDR, and ILD) in memory 16. From these saved results, the viewer 18 can graphically display the waveform analysis to facilitate a simplified interpretation of the results, for example, by ranking the resonant loops according to their impact on system performance, showing loop diagrams with corresponding TDR responses, and highlighting package and board layouts with colors that correspond to the degree of impact. For instance, when the block information for the waveform decomposition is derived from an IC package or a printed circuit board layout, areas of the hardware that experience the most performance degradation can be highlighted with a color, such as red, whereas those areas of the hardware with least impact on performance can be highlighted with a different color, such as green. Other intermediate levels of performance degradation can be highlighted with other colors, such as yellow and blue. The visual effect is to display a route or trace through the IC package or PCB layout with different colors along the route, the different colors representing the impact the hardware in such regions has on the total system performance (the display being analogous to a desired route, displayed by a driving navigation system Global Positioning System (GPS) device, showing various levels of traffic congestion along the route).

Figure 6A:
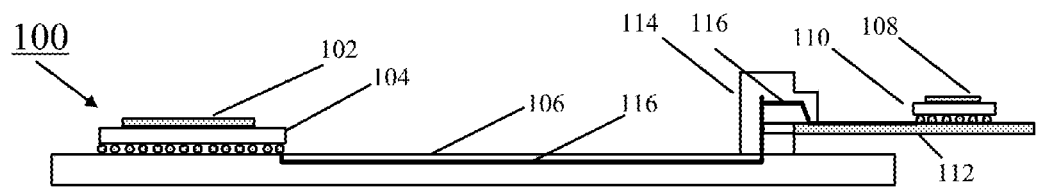
FIG. 6A is an example sketch of a computer system interface to be analyzed.
Figure 6B:
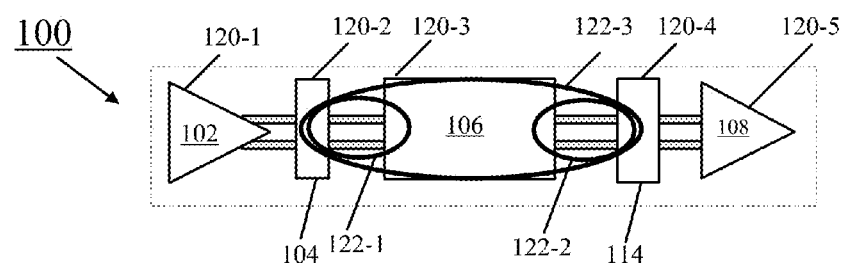
FIG. 6B is an example block diagram representation of the computer system interface of FIG. 5A overlaid by identified resonant loops.
Figure 6C:
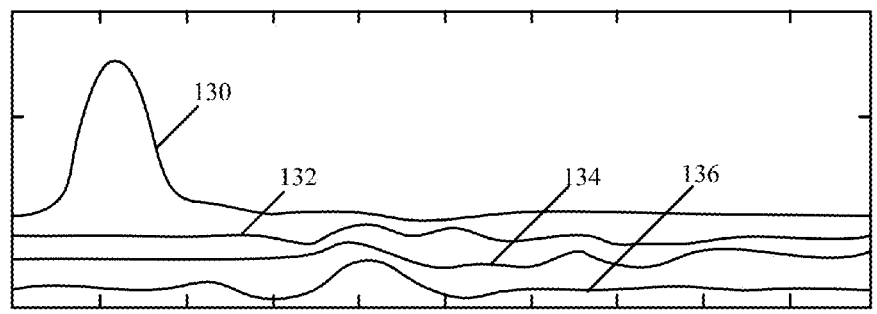
FIG. 6C is a graph of an example set of decomposed waveforms associated with the identified resonant loops.
Figure 6D:
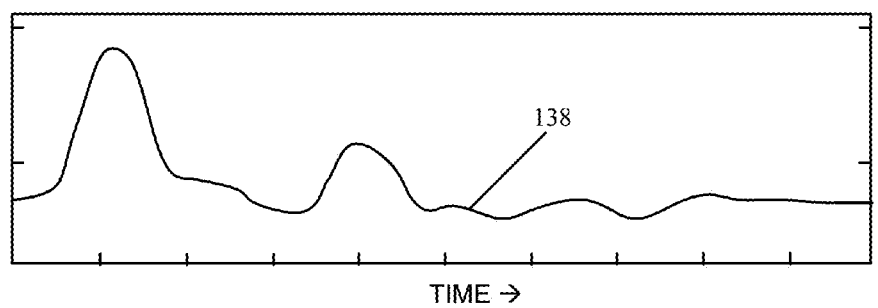
FIG. 6D is a graph of a sum of the set of decomposed waveforms and the total reflection-less pulse response.

FIG. 6A, FIG. 6B, FIG. 6C, and FIG. 6D together show an example of a waveform analysis decomposition process for a computer system interface or channel 100. In overview, FIG. 6A shows an example block diagram of the computer system interface 100; FIG. 6B shows an example block diagram representation of the computer system interface 100 overlaid by resonant loops identified in the channel; FIG. 6C shows an example of the extracted waveforms for the identified resonant loops relative to a total reflection-less pulse response; and FIG. 6D shows a sum of the decomposed waveforms and the total reflection-less pulse response.

More specifically, FIG. 6A shows an embodiment of the computer system interface 100 including a transmitter (Tx) chip 102 mounted on an integrated circuit (IC) package 104. The IC package 104 is fixed to a printed circuit board (PCB) 106. The computer system interface 100 also includes a receiver (Rx) chip 108 mounted on an IC package 110 fixed to a PCB 112. An electrical connector 114 couples the PCB 112 to the PCB 106. An electrical trace 116 extends from a pin of the transmitter IC package 104 through the PCB 106, the electrical connector 114, and along a surface the PCB 112 to a pin of the receiver IC package 110.

FIG. 6B shows an example division of the computer system interface 100 into blocks 120-1, 120-2, 120-3, 120-4, and 120-5 (generally, 120). Each block 120 coincides with an impedance discontinuity in the interconnect (i.e., hardware) of the channel 100. The user can select the blocks manually through the graphical user interface 20 (FIG. 1), or the blocks can be determined automatically by the system design engine 12 (FIG. 1). Block 120-1 corresponds to the Tx chip 102, block 120-2 corresponds to the IC package 104, block 120-3 corresponds to the PCB 106, block 120-4 corresponds to the connector 114, and block 120-5 corresponds to the receiver chip 108. A block 120 can encompass any number of impedance discontinuities in the channel 100. For example, the block 120-5 encompasses the impedance discontinuities of the receiver 108, the receiver package 110, and PCB 112.

Resonant loops 122-1, 122-2, 122-3 (generally, 122) are identified in the channel 100. Each resonant loop 122 spans at least two blocks 120. For example, resonant loop 122-1 spans block 120-2 and block 120-3; resonant loop 122-2 spans block 120-3 and block 120-4; and resonant loop 122-3 spans blocks 120-2, 120-3, and 120-4. In general, as many as $n*(n-1)/2$ loops can be identified in a given system, where n equals the number of defined blocks. In the channel 100, five blocks 120 are defined, enabling as many as ten different loops 122.

FIG. 6C shows the waveforms for each of the resonant loop responses as seen by the receiver 108. Waveform 130 corresponds to the total reflection-less pulse response. Waveform 132 corresponds to the loop response attributed to the resonant loop 122-1, waveform 134 corresponds to the loop response attributed to the resonant loop 122-2, and waveform 136 corresponds to the loop response attributed to the resonant loop 122-3. In FIG. 6D, the waveform 138 corresponds to the sum of the ideal pulse response waveform 130 and the individual loop response waveforms 132, 134, and 136.

Figure 7:
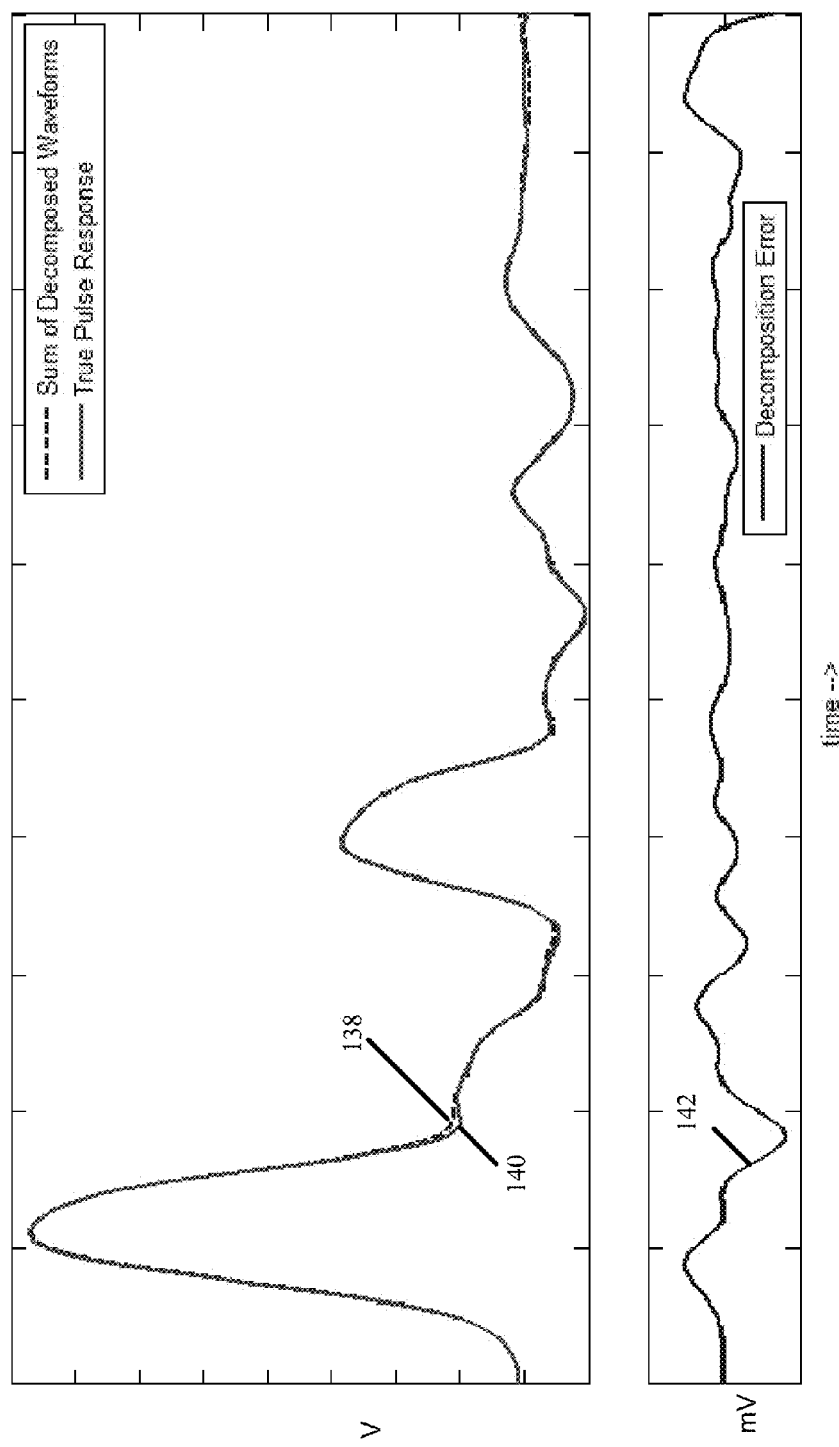
FIG. 7 is a graph of an example comparison between an actual total system response and the sum of decomposed waveforms and the total reflection-less pulse response, the difference corresponding to a decomposition error response.

The quality of the waveform analysis can be estimated by summing the decomposed waveforms and comparing the sum to the true total through response. FIG. 7 shows an example comparison between the true pulse response 140 and the sum waveform 138 (i.e., the sum of the total reflection-less pulse response 130 and loop response waveforms 132, 134, 136). The difference of these two waveforms 138, 140 corresponds to an error response 142, which enables quantification of the accuracy of the analysis and decomposition results.

Figure 8:
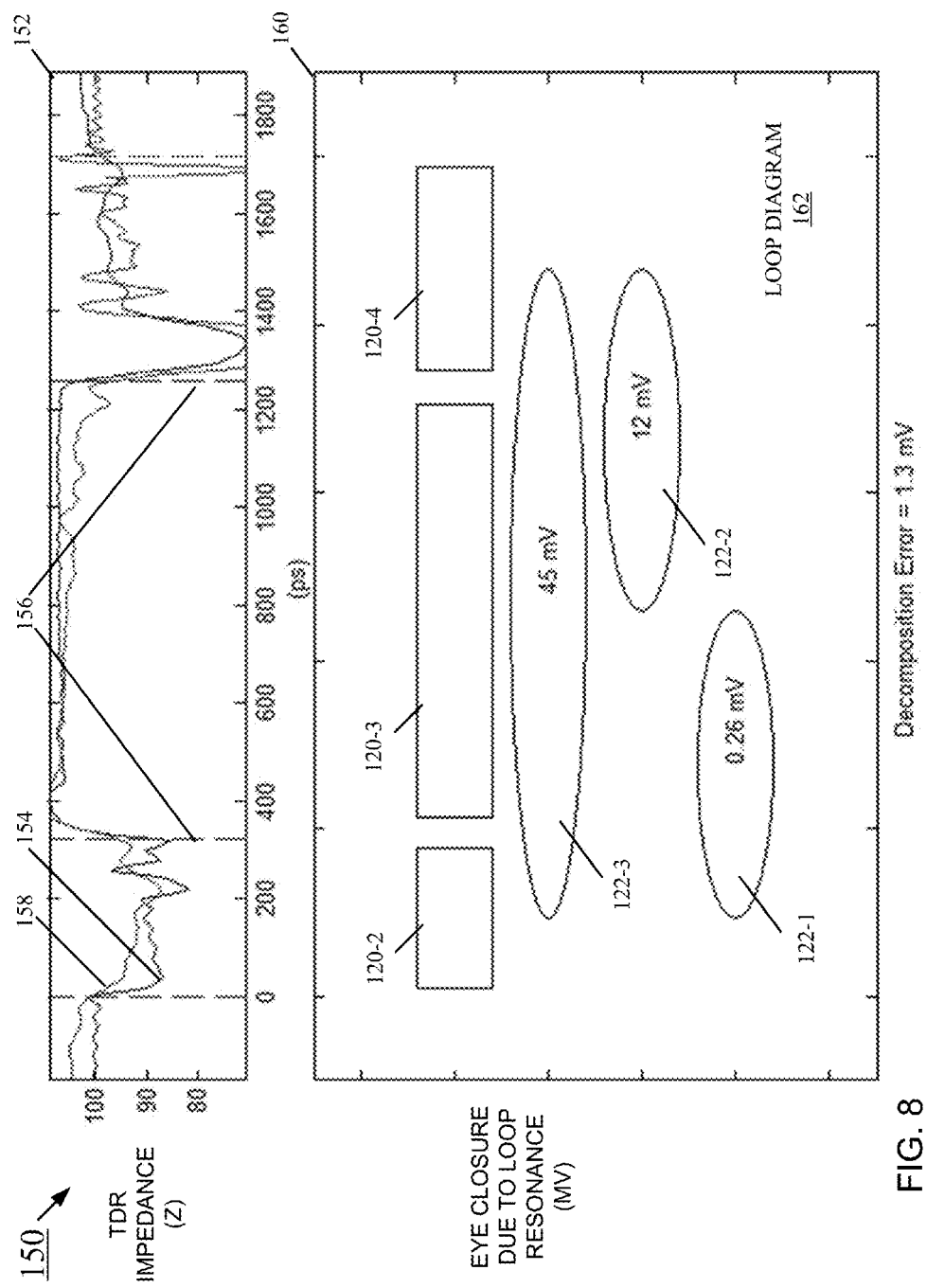
FIG. 8 is an example of a report of results obtained by the pulse response decomposition described in connection with FIGS. 5A-5D and FIG. 6.

FIG. 8 shows an example of a visual report 150 of the results of the pulse response decomposition described in connection with FIGS. 6A-6D and FIG. 7. A user can produce the visual report 150 for a give waveform analysis through the viewer 18 (FIG. 1). The upper portion 152 of the visual report 150 shows a simulated total system time-domain reflectometry (TDR) response 154. The TDR response 154 shows the impedance discontinuities of the system from the transmitter side of the system and TDR response 158 shows the impedance discontinuities of the system from the receiver side of the system. Vertical dashed lines 156 correspond to the boundaries of the block boundaries within the channel 100. Although a common way to visualizing the impedance of a system, a TDR plot does not allow for the quantification of the discontinuities on system performance. The aforementioned pulse response decomposition achieves this quantification, the results of which are shown in the lower portion 160 of the visual report 150.

The lower portion 160 includes a loop diagram 162, which graphically shows the impact on closure of the vertical eye pattern because of each resonant loop. The loop diagram 162 shows the blocks 120-2, 120-3, and 120-4 of FIG. 6B that are the subject of the visual report 150. These blocks are arranged within the lower portion 160 of the report 150 to align between block boundaries 156 in the upper portion 152 of the report 150. The loop diagram 162 may scale the sizes of the blocks to match the phase delay of each block.

Also shown in the loop diagram 162 are the loops 122-1, 122-2, and 122-3 of FIG. 6B. Each loop may be drawn aligned with the pair of blocks that form the opposite ends of that particular loop. Each loop may also be associated with a value (e.g., in mV). The value associated with each loop corresponds to an amount of eye closure (in height) caused by that particular loop resonance. (The eye closure due to a loop response may be processed with a common signal integrity metric (peak distortion analysis)). In this example, the resonant loop 122-3 causes 45 mV of closure in the height of the eye pattern; loop 122-2 causes a 12 mV eye closure, and loop 122-1 causes a 0.26 mV eye closure. The top-to-bottom arrangement of the resonant loops within the loop diagram 162 may be in order or rank of their impact on system performance. Along the bottom of the loop diagram 162 is an indication of the decomposition error (e.g., rms, average) determined as described in connection with FIG. 7. This visual report 150 provides insight into the cause or causes of system performance degradation. Such insight provides an opportunity to optimize the system performance in a systematic manner (in the current example, by focusing efforts on the hardware components of block 120-3 and block 120-4).

Figure 9:
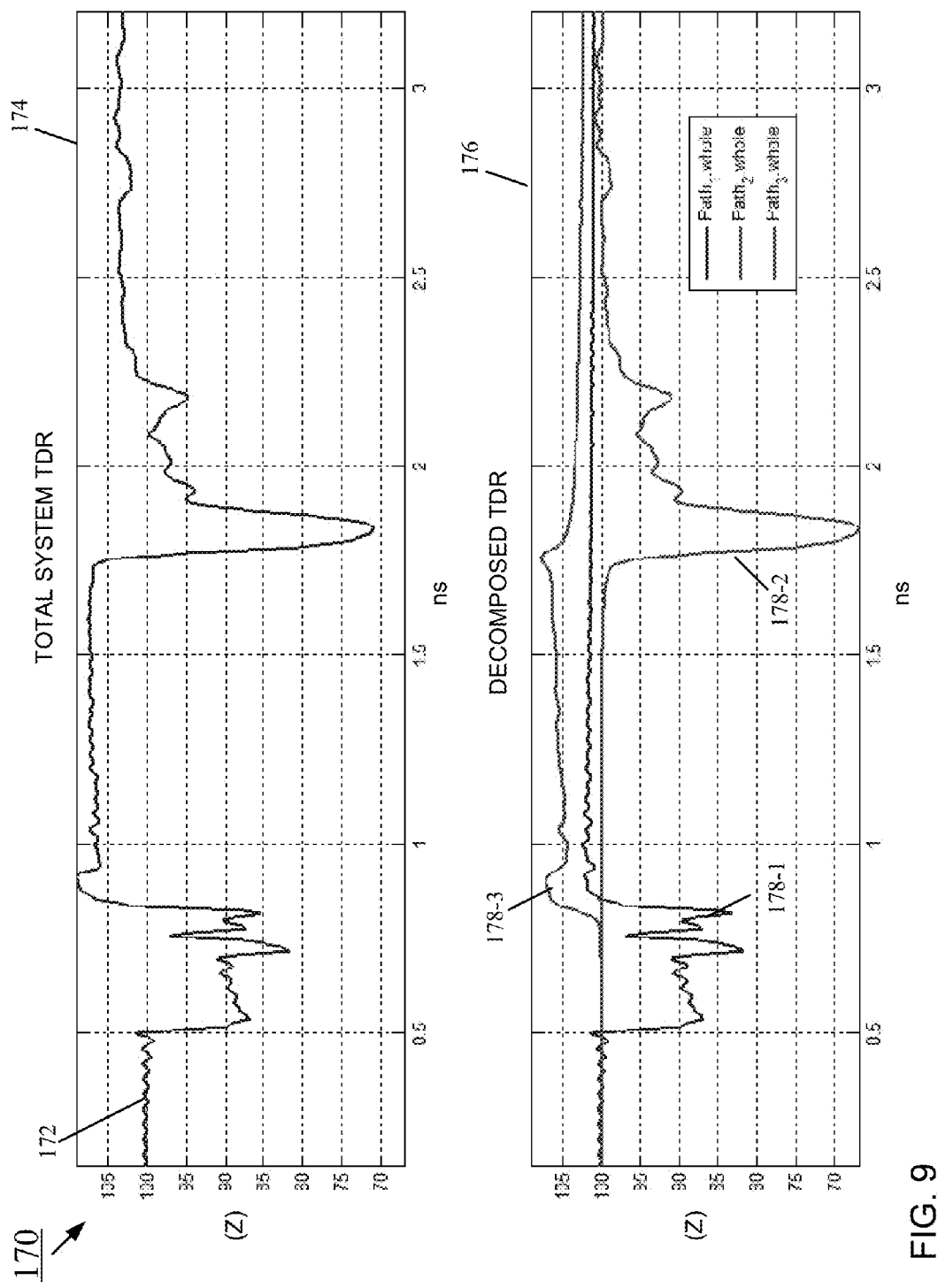
FIG. 9 is an example of a report related to a decomposition of a total system time-domain reflectometry (TDR) response into a plurality of energy paths.

FIG. 9 shows an example of a report 170 related to a TDR decomposition of a total system TDR response 172 into a plurality of energy paths. An upper portion of the report 170 shows the total system TDR response 172, and a lower portion 176 shows the decomposition of the total system TDR response 172 into three energy paths 178-1, 178-2, 178-3 (generally, 178). Each path 178 can be further separated into reflection-less throughput and loop responses.

Figure 10:
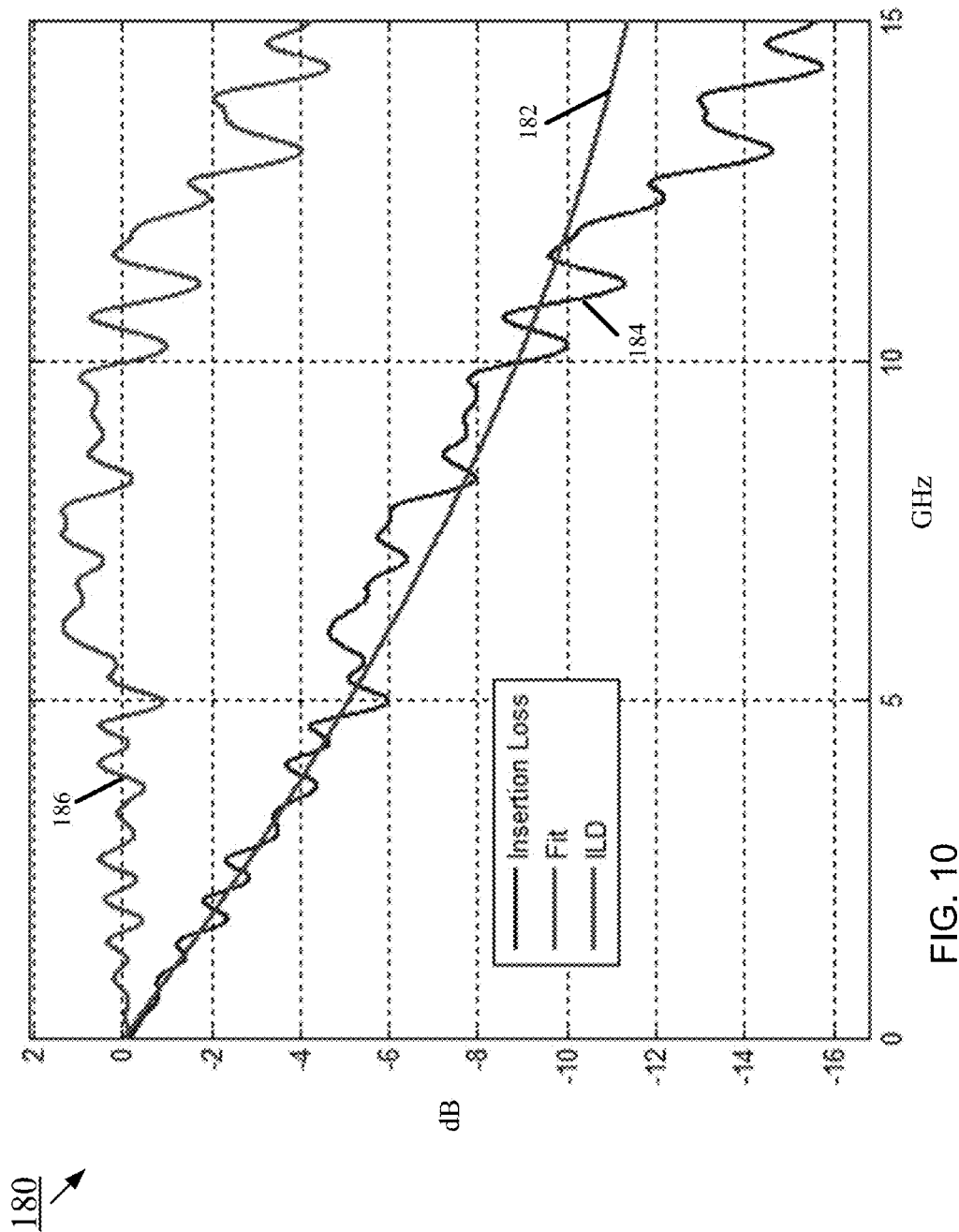
FIG. 10 is a graph of an example of a total system insertion loss deviation (ILD) response in the frequency domain derived from an ideal fit curve and an insertion loss curve.

FIG. 10 shows an example of a graph 180 of the results of an insertion loss deviation (ILD) analysis in the frequency domain. The graph 180 includes an ideal fit curve 182, a simulated ILD response 184, and an ILD waveform 186, which is the difference between the ideal fit 182 and the simulated total system ILD response 184. In general, the ILD waveform 186 can be considered noise that cannot be easily equalized.

Figure 11:
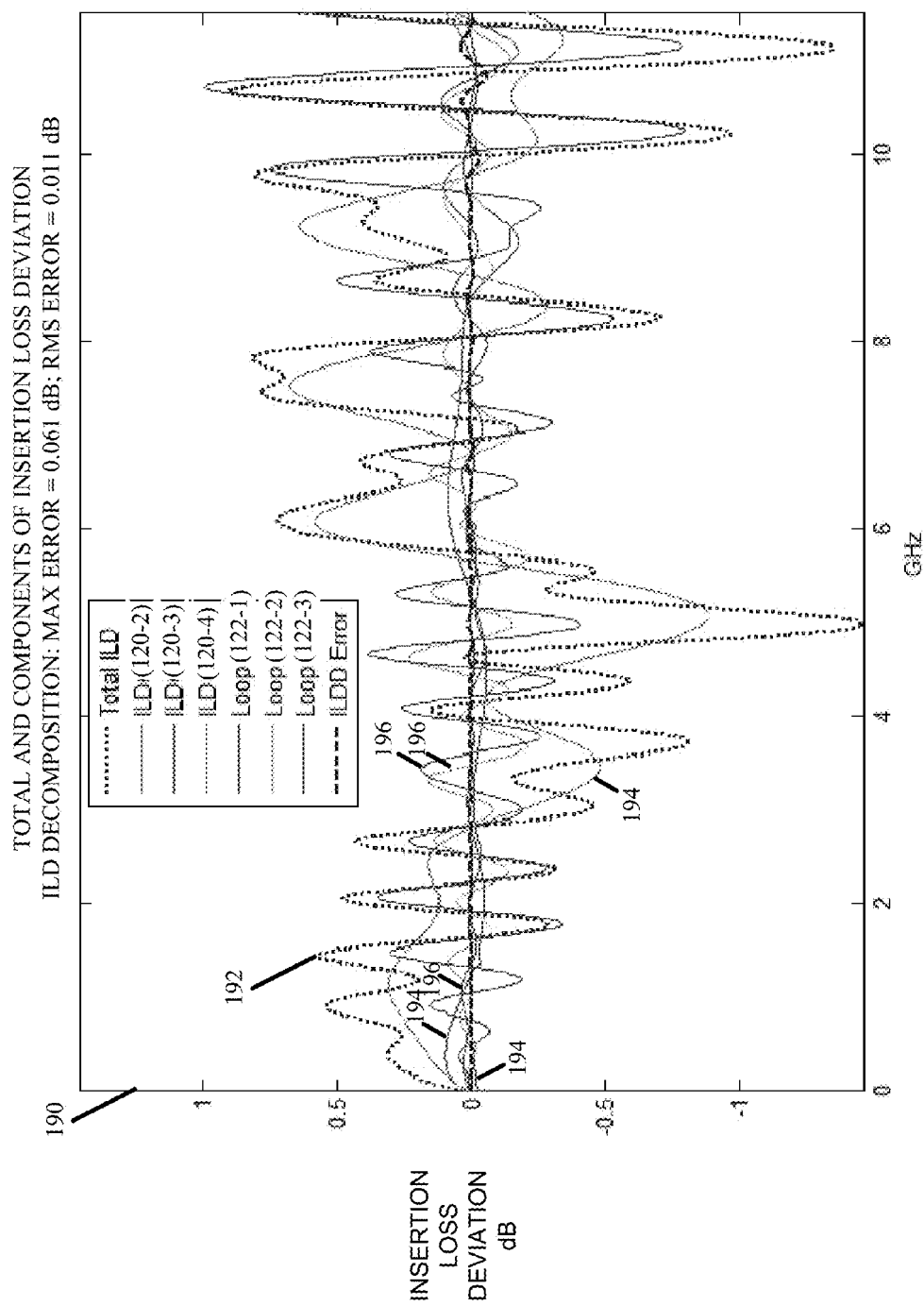
FIG. 11 is a graph of an example decomposition of the total system ILD response.

FIG. 11 shows an example of a graph 190 related to the ILD decomposition of the computer interface 100 of FIG. 6B. Power (in dB) is on the y-axis, and frequency (in GHz) on the x-axis. The graph 190 includes a waveform 192 for the total system ILD response, waveforms 194 for ILD attributed to the blocks 120-2, 120-3, and 120-4, and waveforms 196 for ILD attributed to the three loops 122-1, 122-2, and 122-3. Also included is an ILD error waveform (unnumbered), which is the difference between the total ILD 192 and the sum of the ILD waveforms 194 and 196. Statistics can be obtained from the ILD decomposition, including maximum error and rms error.

Figure 12:
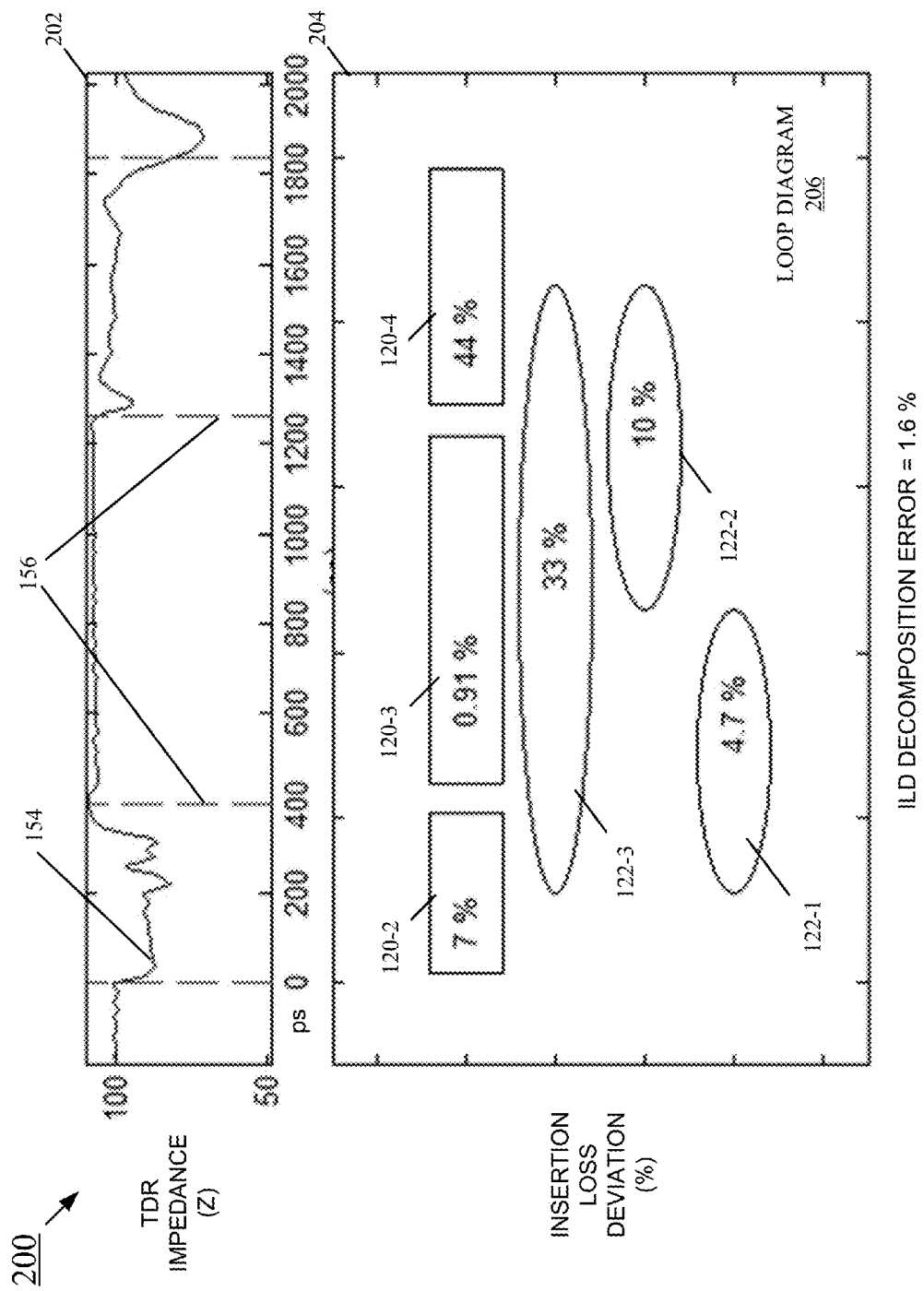
FIG. 12 is an example of a report of results obtained by the ILD decomposition described in connection with FIG. 10 and FIG. 11.

FIG. 12 shows an example of a visual report 200 of the results of the ILD decomposition described in connection with FIG. 10 and FIG. 11. A user can also produce the visual report 200 for a given waveform analysis through the viewer 18 (FIG. 1). The upper portion 202 of the visual report 200 shows a simulated time-domain reflectometry (TDR) response 154 (same as in FIG. 8), which shows the impedance discontinuities that are the source of the resonant loops. Vertical dashed lines 156 correspond to the boundaries of the blocks.

The lower portion 204 includes a loop diagram 206, which graphically shows the insertion loss deviation attributable to each block 120-2, 120-3, and 120-4, and to each loop 122-1, 122-2, and 122-3. The loop diagram 206 shows the blocks 120-2, 120-3, and 120-4 of FIG. 6B that are the subject of the visual report 200. Similar to arrangement of FIG. 8, these blocks 120 are arranged within the lower portion 204 to align between a pair of blocks 156 in the upper portion 202 of the report 200. Also shown in the loop diagram 206 are the loops 122-1, 122-2, and 122-3 of FIG. 6B. Each loop 122 may be drawn aligned with the pair of blocks that form the opposite ends of that particular loop.

Each block 120 and loop 122 may also be associated with a value (e.g., in percentage). The value associated with each block and loop is obtained by taking the root mean square (rms) of the corresponding waveform in FIG. 11. An advantage of the ILD decomposition is that the individual contribution to the ILD of each block can be quantified. In this example, the block 120-2 contributes 7% to the ILD, block 120-2 contributes 0.91%, and block 120-4 contributes 44%. In addition, the loop 122-3 contributes 33% of the ILD; loop 122-2 contributes 10% of the ILD, and loop 122-1 contributes 4.7% of the ILD. In this example, ILD Decomposition error contributes approximately 1.6% (rms) of the ILD.

Figure 13:
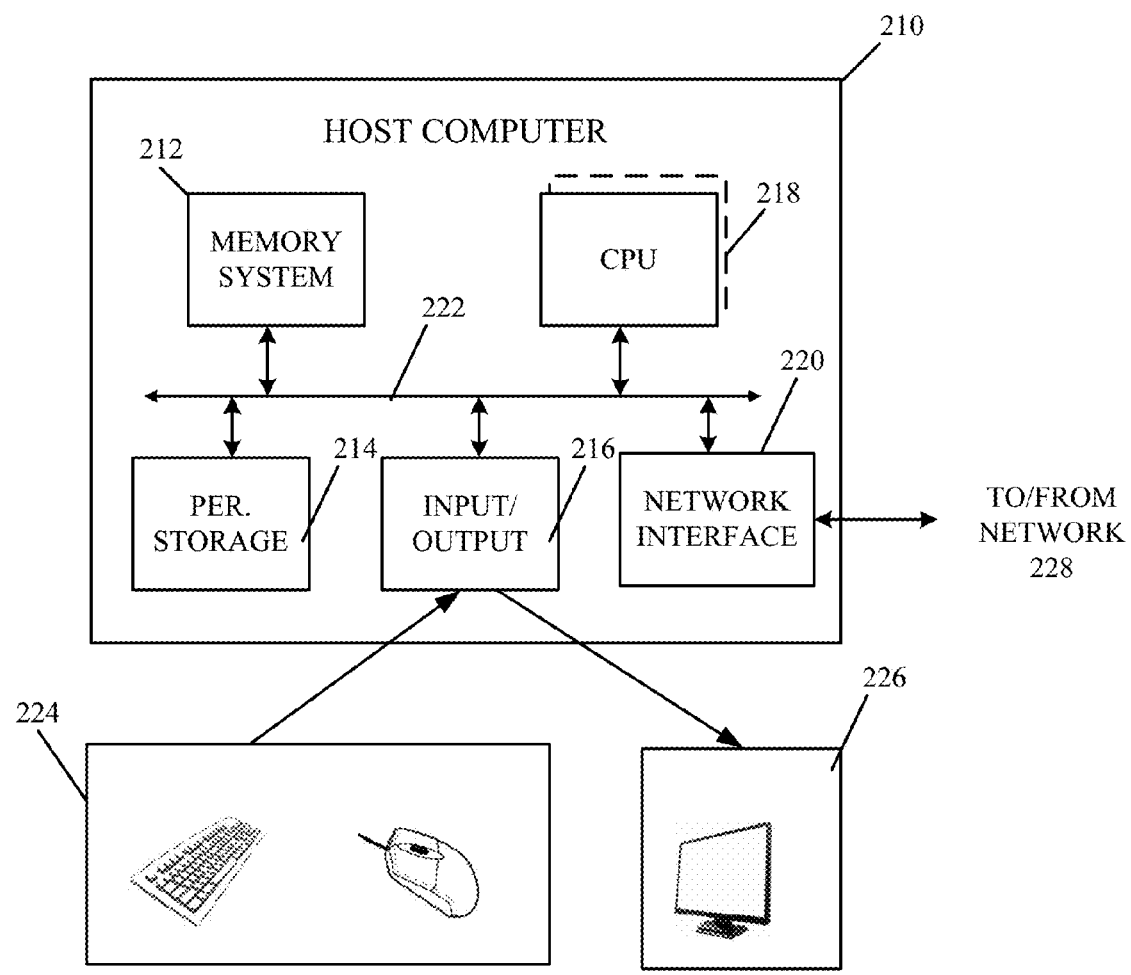
FIG. 13 shows an embodiment of a computing system with which aspects of the waveform analysis simulation system may be practiced.

FIG. 13 shows an embodiment of a computing system 210 with which aspects of the waveform analysis simulation system 10 may be practiced. The computing system 210 includes a memory system 212, a persistent storage memory 214 (e.g., the memory 16 of FIG. 1), an input/output interface 216, one or more central processing units (CPU) 218, and a network interface 220 connected to one or more signal busses 222. Example implementations of the computer system 210 include, but are not limited to, personal computers (PC), Macintosh computers, workstations, laptop computers, kiosks, network terminals, and hand-held devices, such as a personal digital assistant (PDA) and a BlackBerry™, smart-phones, and tablets.

The memory system 212 includes non-volatile computer storage media, such as read-only memory (ROM), and volatile computer storage media, such as random-access memory (RAM). Although shown as a single unit, the memory system 212 may include a plurality of units or modules, of various speeds and different levels (e.g., cache). Typically stored in the ROM is a basic input/output system (BIOS), which contains program code for controlling basic operations of the computer system 210 including start-up of the device and initialization of hardware. Stored within the RAM are program code and data. Program code includes, but is not limited to, application programs, program modules (e.g., browser plug-ins), and an operating system (e.g., Windows 95®, Windows 98®, Windows NT 4.0®, Windows XP®, Windows 2000®, Linux®, and Macintosh®, Apple IOS®, and Android®). Application programs include, but are not limited to, browser software, for example, Chrome®, Firefox®, Internet Explorer®, and Safari®, and a simulation application program that produces the waveform analysis simulation system 10 described herein.

The persistent storage device 214 may be fixed or removable storage memory, examples of which include hard disk drives, floppy drives, tape drives, removable memory cards, USBs, and optical storage.

Over wire or wireless links, the I/O interface 216 is in communication with one or more user-input devices 224 by which a user can enter information and commands and one or more output devices 226, such as a display, printer, and speaker. Examples of user-input devices 224 include, but are not limited to, a keyboard, a mouse, trackball, touch-pad, touch-screen, microphone, and a joystick.

The network interface 218 can be implemented with a network interface card (NIC) by which the computer system 210 is in communication with a network 228. The CPU 218 is representative of a single central processing unit (CPU), multiple CPUs, or a single CPU having multiple processing cores. The CPU 218 executes program code stored in the memory system 212 automatically upon system start-up or in response to user-supplied commands. The signal bus 222 carries signals to and from the various components of the computer system 210. Exemplary implementations of the signal bus 212 include, but are not limited to, a Peripheral Component Interconnect (PCI) bus, an Industry Standard Architecture (ISA) bus, an Enhanced Industry Standard Architecture (EISA) bus, and a Video Electronics Standards Association (VESA) bus. Although shown as a single bus 212, it is to be understood that the various components may use multiple busses for internal communication, and that all components are not necessarily connected to any one given bus.

As will be appreciated by one skilled in the art, aspects of the present invention may be embodied as a system, method, and computer program product. Thus, aspects of the present invention may be embodied entirely in hardware, entirely in software (including, but not limited to, firmware, program code, resident software, microcode), or in a combination of hardware and software. All such embodiments may generally be referred to herein as a circuit, a module, or a system. In addition, aspects of the present invention may be in the form of a computer program product embodied in one or more computer readable media having computer readable program code embodied thereon.

The computer readable medium may be a computer readable storage medium, examples of which include, but are not limited to, an electronic, magnetic, optical, electromagnetic, infrared, or semiconductor system, apparatus, or device, or any suitable combination thereof. As used herein, a computer readable storage medium may be any non-transitory, tangible medium that can contain or store a program for use by or in connection with an instruction execution system, apparatus, device, computer, computing system, computer system, or any programmable machine or device that inputs, processes, and outputs instructions, commands, or data. A non-exhaustive list of specific examples of a computer readable storage medium include an electrical connection having one or more wires, a portable computer diskette, a floppy disk, a hard disk, a random access memory (RAM), a read-only memory (ROM), a USB flash drive, an non-volatile RAM (NVRAM or NOVRAM), an erasable programmable read-only memory (EPROM or Flash memory), a flash memory card, an electrically erasable programmable read-only memory (EEPROM), an optical fiber, a portable compact disc read-only memory (CD-ROM), a DVD-ROM, an optical storage device, a magnetic storage device, or any suitable combination thereof. A computer readable storage medium can be any computer readable medium that is not a computer readable signal medium such as a propagated data signal with computer readable program code embodied therein.

Program code may be embodied as computer-readable instructions stored on or in a computer readable storage medium as, for example, source code, object code, interpretive code, executable code, or combinations thereof. Any standard or proprietary, programming or interpretive language can be used to produce the computer-executable instructions. Examples of such languages include C, C++, Pascal, JAVA, BASIC, Smalltalk, Visual Basic, and Visual C++.

Transmission of program code embodied on a computer readable medium can occur using any appropriate medium including, but not limited to, wireless, wired, optical fiber cable, radio frequency (RF), or any suitable combination thereof.

The program code may execute entirely on a user's computer, partly on the user's computer, as a stand-alone software package, partly on the user's computer and partly on a remote computer or entirely on a remote computer or server. Any such remote computer may be connected to the user's computer through any type of network, including a local area network (LAN) or a wide area network (WAN), or the connection may be made to an external computer (for example, through the Internet using an Internet Service Provider).

Additionally, the methods of this invention can be implemented on a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, or the like.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or a VLSI design. Whether software or hardware is used to implement the systems in accordance with this invention is dependent on the speed and/or efficiency requirements of the system, the particular function, and the particular software or hardware systems or microprocessor or microcomputer systems being utilized. The methods illustrated herein however can be readily implemented in hardware and/or software using any known or later developed systems or structures, devices and/or software by those of ordinary skill in the applicable art from the functional description provided herein and with a general basic knowledge of the computer and image processing arts.

Moreover, the disclosed methods may be readily implemented in software executed on programmed general-purpose computer, a special purpose computer, a microprocessor, or the like. In these instances, the systems and methods of this invention can be implemented as program embedded on personal computer such as JAVA® or CGI script, as a resource residing on a server or graphics workstation, as a routine embedded in a dedicated fingerprint processing system, as a plug-in, or the like. The system can also be implemented by physically incorporating the system and method into a software and/or hardware system, such as the hardware and software systems of an image processor.

While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents, and variations that are within the spirit and scope of this invention.

What is claimed is:

1. A method of analyzing signal performance of a hardware system, the method comprising:
   dividing a simulation of the hardware system into a chain of blocks;
   identifying resonant loops between pairs of blocks in the chain of blocks;
   determining a loop response for each of the identified resonant loops;
   determining an impact of each loop response on a performance of the system; and, graphically displaying a loop diagram, the loop diagram including a diagram of each resonant loop together with an associated quantity representing an impact of that resonant loop on the system performance.

2. The method of claim 1, further comprising:
   generating an analytical expression for a total system response of the hardware system; and
   extracting the loop response for each resonant loop from the analytical expression.

3. The method of claim 1, further comprising computing an insertion loss deviation (ILD) value, in a frequency domain, for each block, for each resonant loop, and for a total system response.

4. The method of claim 1, further comprising:
   summing the loop responses with a total reflection-less pulse response; and
   calculating an error response to quantify accuracy of the determined loop responses by comparing a total system response with the sum of the loop responses and total reflection-less pulse response.

5. The method of claim 1, further comprising analyzing reflection in the hardware system by decomposing a total system time-domain reflectometry (TDR) waveform into a plurality of energy paths and resonant loop responses.

6. The method of claim 5, further comprising graphically displaying the loop diagram juxtapositioned with the TDR waveform.

7. The method of claim 1, further comprising identifying and ranking sources of degradation on the system performance in response to determining the impact of each loop response on the system performance.

8. The method of claim 1, further comprising highlighting, with color, areas in a display of a design layout corresponding to the hardware system, each different highlighting color being associated with a different degree of degradation of the system performance caused by hardware in that highlighted area.

9. The method of claim 1, wherein the impact of each loop response on the system performance correlates to an amount of closure of an eye diagram caused by that loop response.

10. A computer program product for analyzing signal performance of a hardware system, the computer program product comprising:
    a computer readable persistent storage medium having computer readable program code embodied therewith, the computer readable program code comprising:
    computer readable program code configured to divide, if executed, a simulation of the hardware system into a chain of blocks;

computer readable program code configured to identify, if executed, resonant loops between pairs of blocks in the chain of blocks;

computer readable program code configured to determine, if executed, a loop response for each of the identified resonant loops;

computer readable program code configured to determine, if executed, an impact of each loop response on a performance of the system; and, computer readable program code configured to graphically display, if executed, a loop diagram, the loop diagram including a diagram of each resonant loop together with an associated quantity representing an impact of that resonant loop on the system performance.

11. The computer program product of claim 10, wherein the computer readable program code further comprises:

computer readable program code configured to generate, if executed, an analytical expression for a total system response of the hardware system, and computer readable program code configured to extract, if executed, the loop response for each resonant loop from the analytical expression.

12. The computer program product of claim 10, wherein the computer readable program code further comprises computer readable program code configured to compute, if executed, an insertion loss deviation (ILD) value, in a frequency domain, for each block, for each resonant loop, and for a total system response.

13. The computer program product of claim 10, wherein the computer readable program code further comprises:

computer readable program code configured to sum, if executed, the loop responses with a total reflection-less pulse response; and computer readable program code configured to calculate, if executed, an error response to quantify accuracy of the determined loop responses by comparing a total system response with the sum of the loop responses with the total reflection-less pulse response.

14. The computer program product of claim 10, wherein the computer readable program code further comprises computer readable program code configured to analyze, if executed, reflection in the hardware system by decomposing a total system time-domain reflectometry (TDR) waveform into a plurality of energy paths and resonant loop responses.

15. The computer program product of claim 14, wherein the computer readable program code further comprises computer readable program code configured to graphically display, if executed, the loop diagram juxtapositioned with the TDR waveform.

16. The computer program product of claim 10, wherein the computer readable program code further comprises computer readable program code configured to identify and rank, if executed, sources of degradation on the system performance in response to determining the impact of each loop response on the system performance.

17. The computer program product of claim 10, wherein the computer readable program code further comprises computer readable program code configured to highlight with color, if executed, areas in a display of a design layout corresponding to the hardware system, each different highlighting color being associated with a different degree of degradation of the system performance caused by hardware in a highlighted area.

18. The computer program product of claim 10, wherein the impact of each loop response on the system performance correlates to an amount of closure of an eye diagram caused by that loop response.

19. A system for analyzing signal performance of a hardware system, comprising:

memory storing a waveform analysis simulation program; and a processor executing the waveform analysis simulation program to divide a simulation of the hardware system into a chain of blocks, to identify resonant loops between pairs of blocks in the chain of blocks, to determine a loop response for each of the identified resonant loops, to determine an impact of each loop response on a performance of the hardware system; and, to graphically display a loop diagram, the loop diagram including a diagram of each resonant loop together with an associated quantity representing an impact of that resonant loop on the system performance.

20. The system of claim 19, wherein the processor further executes the waveform analysis simulation program to:

generate an analytical expression for a total system response of the hardware system, and extract the loop response for each resonant loop from the analytical expression.

21. The system of claim 19, wherein the processor further executes the waveform analysis simulation program to compute an insertion loss deviation (ILD) value, in a frequency domain, for each block, for each resonant loop, and for a total system response.

22. The system of claim 19, wherein the processor further executes the waveform analysis simulation program to:

sum the loop responses with a total reflection-less pulse response; and calculate an error response to quantify accuracy of the determined loop responses by comparing a total system response with the sum of the loop responses and the total reflection-less pulse response.

23. The system of claim 19, wherein the processor further executes the waveform analysis simulation program to analyze reflection in the hardware system by decomposing a total system time-domain reflectometry (TDR) waveform into a plurality of energy paths and resonant loop responses.

24. The system of claim 23, wherein the processor further executes the waveform analysis simulation program to graphically display the loop diagram juxtapositioned with the TDR waveform.

25. The system of claim 19, wherein the processor further executes the waveform analysis simulation program to identify and rank sources of degradation on the system performance in response to determining the impact of each loop response on the system performance.

26. The system of claim 19, wherein the processor further executes the waveform analysis simulation program to highlight, with color, areas in a display of a design layout corresponding to the hardware system, each different highlighting color being associated with a different degree of degradation of the system performance caused by hardware in that highlighted area.

27. The system of claim 19, wherein the impact of each loop response on the system performance correlates to an amount of closure of an eye diagram caused by that loop response.

* * * * *